US007400720B2

(12) United States Patent
Savoor et al.

(10) Patent No.: US 7,400,720 B2
(45) Date of Patent: Jul. 15, 2008

(54) SYSTEM AND METHOD FOR OPTIMIZING DIGITAL SUBSCRIBER LINE BASED SERVICES

(75) Inventors: Raghvendra G. Savoor, Walnut Creek, CA (US); George Keith Cambron, Round Rock, TX (US); John Porter Van Slyke, Lafayette, CA (US)

(73) Assignee: SBC Knowledge Ventures, L.P., Reno, NV (US)

( * ) Notice: Subject to any disclaimer, the term of this patent is extended or adjusted under 35 U.S.C. 154(b) by 565 days.

(21) Appl. No.: 10/958,631

(22) Filed: Oct. 5, 2004

(65) Prior Publication Data

US 2006/0072722 A1 Apr. 6, 2006

(51) Int. Cl.
*H04M 1/00* (2006.01)
*H04M 9/00* (2006.01)

(52) U.S. Cl. ................................................ 379/399.01

(58) Field of Classification Search ....................... None
See application file for complete search history.

(56) References Cited

U.S. PATENT DOCUMENTS

2003/0086514 A1 5/2003 Ginis et al.
2005/0123027 A1 6/2005 Cioffi et al.
2005/0123028 A1* 6/2005 Cioffi et al. ................. 375/222
2005/0138524 A1* 6/2005 Cioffi ......................... 714/758
2006/0210054 A1* 9/2006 Stiscia .................. 379/399.01

OTHER PUBLICATIONS

Committee T1—Telecommunications, Working Group T1E1.4 (J. Cioffi, editor); Dynamic Spectrum Management Report T1E1.4/2003-018RE (T1E1-38, Spectral Compatibility Aspects for Facilities between a Central Office and the Network-to-Customer Interface (Twisted Pair Transmission System)); Aug. 10, 2004; Washington, D.C. (77 pages).

* cited by examiner

*Primary Examiner*—Ramnandan Singh
(74) *Attorney, Agent, or Firm*—Toler Law Group

(57) ABSTRACT

A method is provided that can be used for modifying a control parameter associated with a digital subscriber line (DSL) service. Initially, a real-time performance parameter is received from a first termination unit that is coupled to an DSL circuit. The real-time performance parameter is measured at the termination unit after the termination unit is provisioned and after the DSL circuit is placed in-service. A value of a control parameter associated with the DSL circuit can be modified based on the measured real-time performance parameter. Further, activity over the DSL circuit can be monitored in real-time and when usage of the DSL circuit is below a threshold, the provisionable service parameter that corresponds to the control parameter is modified. Moreover, a first re-provisioning cycle between the first termination unit and a second termination unit coupled to the DSL circuit can be initiated using the provisionable service parameter.

58 Claims, 2 Drawing Sheets

SYSTEM AND METHOD FOR OPTIMIZING DIGITAL SUBSCRIBER LINE BASED SERVICES

FIELD OF THE DISCLOSURE

The present disclosure relates generally to the optimization of digital subscriber line data service.

BACKGROUND

Digital subscriber line (DSL) has quickly emerged as a high quality solution for high speed Internet access and other services associated with high speed Internet services, such as, voice over Internet protocol (VoIP) and streaming video services. DSL can transmit both voice and data simultaneously over an existing, single copper pair up to 18,000 feet long. Since DSL can utilize existing copper telephone lines, the service costs associated with DSL is relatively low for service providers and for customers. Moreover, since data can be transmitted relatively quickly using DSL, it is a very attractive option for providing high-speed access to end users.

Traditional plain old telephone service (POTS) uses a narrow 4-kHz baseband frequency to transmit analog voice signals, and current modem technology can achieve a data transmission rate of up to 56 kb/s. DSL, e.g., asymmetric DSL (ADSL), can increase the usable frequency range from 4 kHz to 1.1 MHz and can provide a data transmission rate up to 8 Mb/s. Further, frequency division multiplexing (FDM) can allow ADSL to create multiple frequency bands that can be used to carry data simultaneously with POTS signals over the same copper pair. The lower 4-kHz frequency range is reserved for POTS, the middle frequency band is used to transmit upstream data and the larger, higher frequency band is used to transmit downstream data.

Discrete multi-tone (DMT) modulation is the American National Standards Institute (ANSI) standard T1.413 line code. DMT modulation is used to divide the data bandwidth into 256 subchannels, or tones, that range from 20 kHz to 1.1 MHz for ADSL. Upstream data transfer frequencies range from 20 kHz to 160 kHz and downstream data transfer frequencies range from 240 kHz to 1.1 MHz. The remaining tones are used as guard bands for dividing the three frequency bands, and one pilot tone is used in each data stream, both upstream and downstream, for timing purposes. Each tone, or channel, has a spacing of 4.3 kHz and each tone supports a maximum number of 15 bits, which is limited by the signal-to-noise ratio on the channel. Since the tones in the higher frequencies are subject to higher attenuation and noise, the number of bits per tone can be fewer than that in the lower frequencies.

In addition to the normal data bits, an embedded operations channel (EOC) is provided as part of the ADSL protocol for communication between the ATU-C and the ATU-R to provide in-service and out-of-service maintenance, to retrieve a limited amount of ATU-R status information, and to monitor ADSL performance.

Typically, the optimization of the data transmission channels used for DSL data transport, e.g., VoIP and video, is largely ignored due to technical and economic factors. Without optimization, DSL circuits are either over-engineered or under-engineered for performance. Over engineered circuits operate at sub-optimum rates and deliver less performance to the customer. Under-engineered circuits experience frequent data errors that result in increased peer-to-peer communications required to perform re-transmissions of data packets. This yields a reduced throughput to the customer. Some under-engineered circuits experience error rates severe enough to cause service interruption or the inability to establish the data channel when initially requested by the customer.

Accordingly, there is a need for a system and method for optimizing digital subscriber line data service.

BRIEF DESCRIPTION OF THE DRAWINGS

The present invention is pointed out with particularity in the appended claims. However, other features are described in the following detailed description in conjunction with the accompanying drawings in which:

DETAILED DESCRIPTION OF THE DRAWINGS

A method is provided that can be used for modifying a control parameter associated with a digital subscriber line (DSL) service. Initially, a real-time performance parameter is received from a first termination unit that is coupled to a DSL circuit. The real-time performance parameter can be measured at the termination unit after the termination unit is provisioned and after the DSL circuit is placed in-service. In a particular embodiment, a value of a control parameter associated with the DSL circuit can be modified based on the measured real-time performance parameter.

In another particular embodiment, activity over the DSL circuit is monitored in real-time. Further, a determination is made to ascertain when usage of the DSL circuit is below a threshold. The provisionable service parameter corresponding to the control parameter can be modified when the usage is below the threshold. In still another particular embodiment, a first re-provisioning cycle between the first termination unit and a second termination unit coupled to the DSL circuit can be initiated using the provisionable service parameter.

In yet another particular embodiment, the first termination device is a DSL modem. Further, the second termination device is a DSL modem. Also, in another particular embodiment, a determination is made in order to determine whether operation of the DSL circuit is within an acceptable operating range. The provisionable service parameter is modified after determining that the operation of the DSL circuit is not within the acceptable operating range. Further, performance data of the termination unit is monitored and a determination is made in order to ascertain whether operation of the DSL circuit is stable based on the monitored performance data.

In another embodiment, a digital subscriber line (DSL) network is provided and includes a first modem at a central office and a second modem at a remote site. A DSL channel is established between the first modem and the second modem. Further, a computer communicates with the first modem and the second modem. The computer includes a program for modifying a provisionable service parameter associated with the DSL channel based on measured in-service performance parameters received from the first modem or the second modem.

In yet another embodiment, a method for modifying a data network is provided and includes provisioning a data circuit within the data network with a first set of provisioning parameters. Thereafter, a first set of in-service performance data is acquired from a terminating unit coupled to the data circuit. A second set of provisioning parameters is determined based on the first set of performance data. The data circuit can be re-provisioned with the second set of provisioning parameters.

Figure 1:
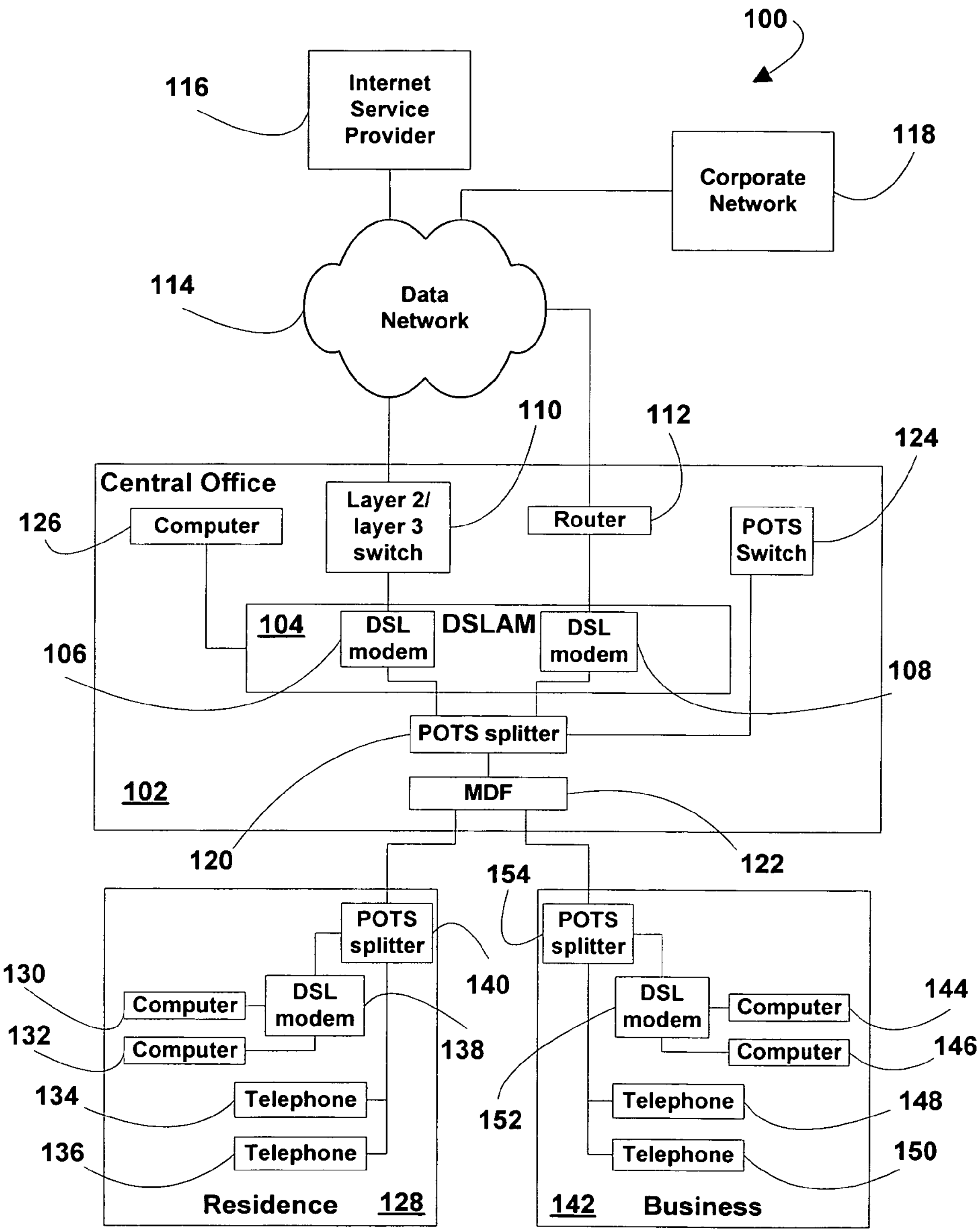
FIG. 1 is a diagram of an exemplary DSL network.

Referring to FIG. 1, an exemplary, non-limiting embodiment of a DSL network is shown and is generally designated 100. In a particular embodiment, the DSL network can be an ADSL network, an ADSL 2 network, an ADSL 2+ network, or a very high data rate DSL (VDSL) network. As illustrated in FIG. 1, the DSL network 100 includes a central office (CO) 102 in which a DSL access multiplexer (DSLAM) 104 can be located. A first central DSL modem 106 and a second central DSL modem 108 are located in the CO 102. In the case in which the DSL network is an ADSL network, each DSL modem in the CO 102 can be an ADSL terminating unit—central office (ATU-C). In a particular embodiment, the first DSL modem 106 and the second DSL modem 108 are installed in the DSLAM 104.

In an illustrative embodiment, a layer 2/layer 3 switch 110 is connected to the first DSL MODEM 106 and a router 112 is connected to the second DSL MODEM 108. In a particular embodiment, the layer 2/layer 3 switch 100 is an asynchronous transfer mode (ATM) switch or an Ethernet switch. As shown, the layer 2/layer 3 switch 110 and the router 112 are connected to a data network 114, e.g., the Internet. As such, in a particular embodiment, the layer 2/layer 3 switch 110 and the router 112 provide data network connectivity to the first DSL MODEM 106 and the second DSL MODEM 108. In an illustrative embodiment, an Internet service provider (ISP) 116 is connected to the data network 114. Moreover, a corporate network 118 is connected to the data network 114. For simplicity, only one ISP 116 and only one corporate network 118 is shown connected to the data network 114, but any number of ISPs and any number of corporate networks 118 can be connected to the data network 114.

FIG. 1 further shows that the CO 102 includes a plain old telephone service (POTS) splitter 120 that can be connected to the first DSL MODEM 106 and the second DSL MODEM 108. Also, a main distribution frame (MDF) 122 is connected to the POTS splitter 120. A POTS switch 124 can be connected to the POTS splitter 120 in order to switch incoming telephone calls received at the CO 102. Additionally, the CO 102 includes a managing computer 126 that can be connected to the DSLAM 104. In a particular embodiment, the managing computer 126 can be used to manage the DSL network 100 and to enhance or optimize the performance of the DSL network 100.

As depicted in FIG. 1, the DSL network 100 can connect to a customer residence 128 in which a first computer 130 and a second computer 132 are located. FIG. 1 also shows a first telephone 134 and a second telephone 136 that are located in the customer residence 128. As shown in FIG. 1, the first computer 130 and the second computer 132 are connected to a remote DSL modem 138. In the case that the DSL network 100 is an ADSL network the remote DSL modem 138 can be an ADSL terminating unit—remote (ATU-R). The remote DSL modem 138 is connected to a remote POTS splitter 140 that, in turn, is connected to the MDF 122. Accordingly, either the first central DSL modem 106 or the second central DSL modem 108 can communicate with the remote DSL modem 138 via the POTS splitter 120, the MDF 122, and the remote POTS splitter 140 in order to provide network connectivity to the computers 130, 132.

FIG. 1 shows that the telephones 134, 136 are also connected to the remote POTS splitter 140. Telephone calls made by the telephones 134, 136 can be routed to the POTS switch 124 at the CO 102 via the remote POTS splitter 140, the MDF 122, and the POTS splitter 120. In the exemplary, non-limiting embodiment of the DSL network 100 shown in FIG. 1, two computers 130, 132 and two telephones 134, 136 are illustrated, but any number of computers and telephones can be located in the customer residence 128 and connected to the CO 102.

FIG. 1 illustrates that the DSL network 100 can further include a customer business 142 in which a first computer 144 and a second computer 146 are located. A first telephone 148 and a second telephone 150 can also be located in the customer business 142. As shown in FIG. 1, the first computer 144 and the second computer 146 are connected to remote DSL modem 152. In a particular embodiment, the remote DSL modem 152 is connected to a remote POTS splitter 154 that, in turn, is connected to the MDF 122. Accordingly, either the first central DSL modem 106 or the second central DSL modem 108 can communicate with the remote DSL modem 152 via the POTS splitter 120 within the CO 102, the MDF 122, and the remote POTS splitter 154 in order to provide network connectivity to the business computers 144, 146.

FIG. 1 shows that the business telephones 148, 150 are also connected to the remote POTS splitter 154. Telephone calls made by the telephones 148, 150 can be routed to the POTS switch 124 located at the CO 102 via the remote POTS splitter 154, the MDF 122, and the CO POTS splitter 120. In an illustrative embodiment, two business computers 144, 146 and two business telephones 148, 150 are illustrated, but any number of business computers and business telephones can be located in the customer business 142 and connected to the CO 102.

In a particular embodiment, data can be transmitted over the DSL network 100 using transmission control protocol/internet protocol (TCP/IP), file transfer protocol (FTP) (e.g., for large files), user datagram protocol (UDP) (e.g., for VoIP and streaming video), or real-time transport protocol (RTP) (e.g., for streaming video files or streaming audio files). As such, the protocol used is an indirect user of the physical layer of the DSL network 100. In order to provide peak DSL service, and peak protocol throughput, using the DSL network 100, the physical layer of the DSL network 100 can have its performance enhanced or optimized. In other words, the circuits in the DSL network 100 that are established between the CO 102 and the customer residence 128 can be enhanced or optimized. Optimization is a process of finding and establishing optimal values for provisionable data communications parameters. Once a circuit is optimized, it can provide optimum or near optimum DSL service regardless of the operating conditions.

In an illustrative embodiment, DSL performance is dominated by two major factors: 1) insertion loss caused by the transmission cable connecting the DSL modems; and 2) electronic noise that reduces the signal to noise ratio at the modem receivers. The electronic noise generally includes a relatively predictable amount of random noise and intermittent noise known as impulse noise. Construction and service records can provide information about the transmission channel loop from which the insertion loss can be ascertained. However, both components of the noise on the channel are unknown. Typically, a service provider does not measure the noise on its circuits before a sale is made to a customer, nor does the service provider typically have accurate information about expected or anticipated noise levels on the data communication circuit that will be used by a customer. Loss and noise could be measured prior to circuit provisioning, but the costs associated with such a project could be overly expensive.

In a particular embodiment, the information necessary to enhance or optimize the circuits in the DSL network 100 is available, but only after the circuits have been provisioned, service has been activated, and after the service is in use by one or more customers.

Figure 2:
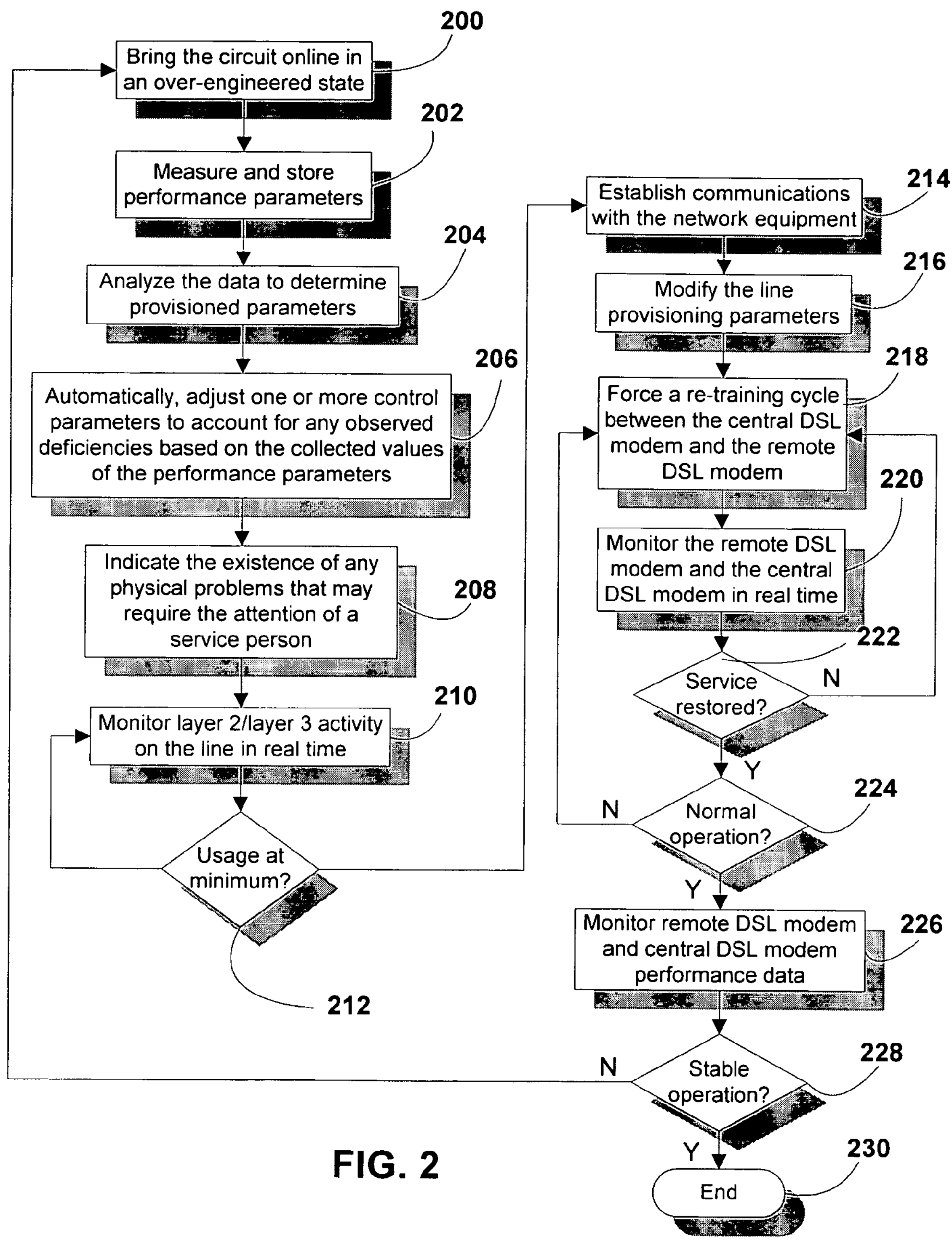
FIG. 2 is a flow chart to illustrate an exemplary method for optimizing a DSL network.

Referring now to FIG. 2, a method for enhancing or optimizing a DSL network is shown. In a particular embodiment, the method can be used to optimize the DSL network 100 shown in FIG. 1. During execution of the method, several measurements are taken, recorded, and analyzed for the DSL network 100 to promote statistical confidence. These performance parameters can be used to affect the settings of one or more control parameters. In an illustrative embodiment, the performance parameters that can be measured during the optimization of the DSL network are shown in Table 1. Further, the control parameters are shown in Table 2.

TABLE 1

Exemplary, Non-limiting DSL Performance Parameters.

| Performance Parameter | Description |
|---|---|
| NMR | The Noise Margin Ratio measured upstream and downstream. |
| Max Bit Rate | The maximum data rate the channel can support (assessed by an DSL modem). |
| Net Rate (Actual Rate) | The bit rate currently available to the customer. |
| QLN[n] | The Quiet Line Noise measured during a brief period, e.g., less than two minutes for each DSL DMT. |
| Hlog[n] | The insertion loss of the DSL channel measured for each DSL DMT. |
| CV[t] | A times series of counts of Code Violations (CV) wherein each CV represents a data packet that could not be corrected by the channel's provisioned forward-error-control parameters; |
| ES[t] | A time series of counts of Errored Seconds (ES) wherein each ES is a one second interval during which one to M CVs are observed and wherein M is a value set in DSL standards. |
| SES[t] | A time series of counts of Severely Errored Seconds (SES) wherein each SES is a one second interval during which greater than M CVs are observed. |
| SYMu[t] | A count during a fifteen minute interval of the number of user data packets sent and received over the DSL channel. |
| SYMd[t] | A count during a fifteen minute interval of the number of overhead data packets sent and received over the DSL channel. |
| Power | The transmission power of the data signal. |
| PSD[n] | The power spectral density of the data signal. |
| Freq range | The tone indices of the DSL DMT. |
| MSE[n] | The noise over the channel when the DSL modem is operating. |
| SNR[n] | The signal to noise ratio for each tone. |
| B[n] | The total bits for each tone. |
| G[n] | The gain for each tone. |
| Dual Path On? | Fast, Interleaved on/off |
| Forward Error Correction | The information added to the data transmitted over the DSL channel in order to account for any bits that are corrupted during transmission. The FEC parameters can include: N, which is the Reed Solomon codeword length; P, which is the Parity bytes/codeword (4 bits); D, which is the Interleave depth (6 bits); and S, which is the DMT symbols/codeword. |
| Trellis On? | An indication of whether Trellis coding is on or off. |
| ATTNDR | The attainable rate for the DSL channel. |
| Code violations | One or more code violations for the DSL channel, e.g., cyclic redundancy check (CRC), errored second (ES), forward error correction (FEC), etc. |
| Attenuation | The difference between the total maximum transmitted power at one end of the DSL channel and the total power received at the remote end of the DSL channel, e.g., loop attenuation as specified in International Telecommunications Union (ITU) Standard G.992.3 |
| Margin | The margin available to accommodate increases losses on the DSL channel, e.g., due to temperature changes, physical aging of equipment, physical aging of copper lines, etc. |

TABLE 2

Exemplary, Non-limiting Control Parameters.

| Control Parameter | Description |
|---|---|
| Power | The transmission power of the data signal. |
| PSD | The power spectral density of the data signal. |
| ADDNMR | The additional noise margin and signal noise ratio. |
| MAXSNRM | The maximum noise margin and signal noise ratio. |
| TARSNRM | The target noise margin and signal ratio. |
| Dual Paths | The ability to use two data transmission paths. |
| Forward Error Correction (FEC) controls | The controls used to account for any bits that are corrupted during transmission. The FEC controls can include: N, which is the Reed Solomon codeword length; P, which is the Parity bytes/codeword; D, which is the Interleave depth (6 bits); and S, which is the DMT symbols/codeword. |
| Data rate | The upstream and downstream data transmission rate. |

At block 200, an DSL circuit, i.e., a connection between one of the DSL modems 106, 108 (FIG. 1) at the CO 102 and a user computer is brought on-line in an over-engineered state, i.e., in optimal conditions. This provides that the DSL service to the customer computer is established. At block 202, the performance parameters are measured in real-time at each DSL modem, e.g., the DSL modem at the CO and the DSL modem at the residence, and stored. In a particular embodiment, QLN is measured during a brief period, e.g., less than two minutes. Moreover, in a particular embodiment, CV[t], ES[t], SES[t], SYMu[t] and SYMd[t] are measured in real-time during an observation time period $T_{obs}$. In an illustrative embodiment, $T_{obs}$ is approximately fifteen minutes. Further, in a particular embodiment the performance parameters can include dynamic spectrum management (DSM) data. Additionally, in a particular embodiment, the performance parameters can be measured and stored multiple times over a predetermined time period, e.g., every 8 hours for twenty four hours, in order to promote statistical confidence.

In a particular embodiment, to optimize the portion of the DSL circuit transmitting data to a user computer, each of these measurements may be measured by an DSL modem at a user residence. Also, in a particular embodiment, the measurements may be taken by a DSL modem at the CO 102 (FIG. 1) in order to optimize the portion of the DSL circuit transmitting data from the user computer to the DSL modem at the CO 102 (FIG. 1). Moreover, once measured, the values can be communicated by the DSL modem at the residence 128 (FIG. 1) or one of the DSL modems 106, 108 (FIG. 1) at the CO 102 (FIG. 1) to a secure website or a secure computer via a secure network connection.

Proceeding to block 204, the performance parameters measured in step 202 are analyzed in order to make a number of determinations. In an illustrative embodiment, the maximum attainable bit rate is determined, e.g., by a reported value from the ATU-C or the ATU-R. Moreover, the loop length can be estimated based in part on the HLOG[n] values for the upstream portion of the DSL channel. In a particular embodiment, excessive power levels can be detected. Further, any cross talk, any white noise, and any non-linear echoes can be detected based on patterns observed in the empirical data collected per tone. For example, cross talk can be determined in part based on the QLN[n] values measured above. In a particular embodiment, the source of white noise or cross talk can be determined based on the "finger prints" of the different sources of the white noise. The "finger prints" of the sources of the white noise can be empirically determined and can include carrier tones or frequencies associated with the sources of the white noise or cross talk. The sources of the white noise or cross talk can include, for example, amplitude modulation (AM) radio interference, HAM radio interference, ionosphere interference that can depend on a time of day, and T-carrier interference.

In a particular embodiment, the presence and location of bridged taps, the presence of bad splices, the presence of bad grounds, and the presence of bad bonds can be determined based in part on the values of the performance parameters measured above. Additionally, an inadequately filtered inside wire at a customer location, the presence of a maintenance test unit, and the presence of an alarm system on an DSL line can be determined based in part on the values performance parameters measured above.

At block 206, one or more of the control parameters, shown in Table 2, are automatically adjusted to account for any observed deficiencies based on the collected values of the performance parameters. For example, in a particular embodiment, the data rates can be adjusted to maximize service performance. Power and noise margin settings can be adjusted. PSD masks are adjusted to limit cross talk on the DSL channel. Further, the forward error correction (FEC) controls and interleaved settings can be adjusted to optimize TCP/IP performance and minimize signal latency in the presence of impulse noise. Proceeding to block 208, the existences of any physical problems that may require the attention of service person are indicated, e.g., to the customer or a service person. The physical problems can include one or more bridged taps, one or bad wire bonds, one or more bad grounds, one or more bad splices, one or more line filtering problems, and may require the attention of a service person in order to correct the problem.

Moving to block 210, layer 2 and layer 3 activity on the DSL circuit is monitored in real-time. (Layer 2 and layer 3 are based on the OSI seven-layer model of networking.) At step 212, a decision is made in order to determine when usage of the DSL circuit is at a minimum. If the usage is not at a minimum, the logic returns to block 210 and the activity on the DSL circuit continues to be monitored. On the other hand, when the usage is at a minimum, the logic proceeds to block 214 and communication is established between the ATU-C and the ATU-R. At block 216, the line provisioning parameters are modified based on the data collected and analyzed above. In a particular embodiment, the line provision parameters are modified based on the adjusted control parameters. Moving to block 218, a re-training cycle is forced between the ATU-R and the ATU-C. Then, the ATU-R and the ATU-C are monitored in real-time, at block 220. Proceeding to step 222, a determination is made in order to ascertain whether service over the DSL circuit is restored. If service is not restored, the logic returns to block 218 and another re-training cycle is forced between the ATU-C and the ATU-R and continues as previously described. If service is restored, the logic continues to step 224.

At step 224, a decision is made in order to determine whether operation of the DSL circuit is within a normal operating range. If the operation is not within the normal operating range, the logic returns to block 218 and continues as previously described. Conversely, if the operation of the ADLS circuit is within the normal operating range, the logic moves to block 226 where the ATU-R and the ATU-C are monitored. Specifically, in a particular embodiment, performance data for the ATU-R and the ATU-C is monitored. At step 228, a determination is made in order to determine if the operation of the DSL circuit is stable. If not, the logic returns to step 200 and the DSL circuit is re-optimized using the steps previously described. If the operation of the DSL circuit is stable, the logic ends at state 230.

In a particular embodiment, the method can be repeated iteratively for each new DSL line until each new DSL line reaches an acceptable state of performance. Moreover, each line can be managed using a state machine translation table that incorporates the performance parameters and control parameters shown in Table 1 and Table 2.

With the configuration of structure described above, the system and method for optimizing DSL data service provides a method to improve and preferably to ensure optimal performance of individual circuits of an DSL network based on numerous parameters measured in real-time. In an illustrative embodiment, each DSL circuit can be optimized many times over the life of the DSL circuit. For example, each DSL circuit can be optimized on a predetermined schedule, e.g., once a week, twice a week, once a month, twice a month, once every two months, once every six months, once a year, etc. Also, the DSL circuit can be monitored and when the operation of the DSL circuit becomes unstable, settings associated with the DSL circuit can be adjusted or modified to bring the operation of DSL circuit into a stable state. Further, the DSL circuit can be optimized when requested by the customer, if the customer believes his or her DSL service is not functioning properly.

In a particular embodiment, the entire process can be encapsulated in a software program that can be executed by a computer connected to the DSL network, e.g., the central office computer 126. The central office computer 126 can interface with the ATU-Cs and the ATU-Rs, or their respective agents, in order to obtain performance data, extract provisioning data, implant provisioning data, and control the circuit provisioning in order to provide optimum performance of each DSL circuit.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method for modifying a control parameter associated with an asymmetric digital subscriber line (DSL) service, the method comprising:

receiving at least one real-time performance parameter from a first termination unit coupled to a DSL circuit, the real-time performance parameter measured over a predetermined period of time at the termination unit after the termination unit is provisioned and after the DSL circuit is placed in-service; and modifying a value of at least one control parameter associated with the DSL circuit at least partially based on the at least one real-time performance parameter measured over the predetermined period of time so that statistical confidence of the real-time performance parameter is established.

2. The method of claim 1, further comprising:

monitoring activity over the DSL circuit in real-time.

3. The method of claim 2, further comprising:

determining when usage of the DSL circuit is below a threshold; and modifying at least one provisionable service parameter corresponding to the at least one control parameter.

4. The method of claim 3, further comprising;

initiating a first re-provisioning cycle between the first termination unit and a second termination unit coupled to the DSL circuit using the at least one provisionable service parameter.

5. The method of claim 4, wherein:

the first termination device is an DSL modem; and the second termination device is an DSL modem.

6. The method of claim 5, further comprising:

determining whether operation of the DSL circuit is within an acceptable operating range; and modifying the at least one provisionable service parameter after determining that the operation of the DSL circuit is not within the acceptable operating range.

7. The method of claim 6, further comprising:

monitoring performance data of the termination unit; and determining whether operation of the DSL circuit is stable at least partially based on the monitored performance data.

8. The method of claim 1, wherein the at least one real-time performance parameter is a noise parameter.

9. The method of claim 8, wherein the noise parameter is at least one of the following:

a Noise Margin Ratio measured upstream and downstream in the DSL circuit;

a Quiet Line Noise value measured during a predetermined time period for each DMT within the DSL circuit;

a noise value within the DSL circuit measured while the DSL circuit is in-service; and an insertion loss of the DSL circuit.

10. The method of claim 9, wherein the Quiet Line Noise is measured during a period of less than two minutes.

11. The method of claim 1, wherein the at least one real-time performance parameter is an error parameter.

12. The method of claim 11, wherein the at least one error parameter is at least one of the following:

a time series of counts of Code Violations (CV), wherein each CV represents a data packet that could not be corrected by one or more forward-error control parameters associated with the DSL circuit;

a time series of counts of Errored Seconds (ES), wherein each ES is a one second interval during which one to M CVs are observed and wherein M is a predetermined value; and a time series of counts of Severely Errored Seconds (SES), wherein each SES is a one second interval during which greater than M CVs are observed.

13. The method of claim 1, wherein the at least one real-time performance parameter is a data transmission parameter.

14. The method of claim 13, wherein the at least one data transmission parameter is at least one of the following:

an assessment by the first termination unit or second termination unit of a maximum data rate the DSL circuit can support;

a bit rate currently available to the customer;

a total number of bits available for each tone in the DSL circuit;

an attainable data transmission rate for the DSL circuit;

a gain for each tone in the DSL circuit;

a first count during a predetermined time interval of the number of user data packets sent and received over the DSL circuit; and a second count during a predetermined time interval of the number of overhead data packets sent and received over the DSL circuit.

15. The method of claim 14, wherein the first count and the second count are measured over a period of approximately fifteen minutes.

16. The method of claim 1, wherein the at least one real-time performance parameter is a signal power parameter.

17. The method of claim 16, wherein the signal power parameter is at least one of the following:

a transmission power value of a data signal;

a power spectral density value of the data signal; and an attenuation value that is the difference between a total maximum transmitted power at one end of the DSL circuit and a total power received at a remote end of the DSL circuit.

18. The method of claim 1, wherein the at least one real-time performance parameter is a margin available to accommodate signal losses.

19. The method of claim 1, wherein the at least one real-time performance parameter is a forward error correction parameter.

20. The method of claim 1, wherein the at least one real-time performance parameter is a dual path parameter, wherein the dual path parameter indicates whether an interleaving setting is activated.

21. The method of claim 1, wherein the at least one real-time performance parameter is a Trellis parameter, wherein the Trellis parameter indicates whether Trellis coding is activated.

22. The method of claim 1, wherein the at least one real-time performance parameter is a frequency range parameter that includes tone indices of the DSL circuit.

23. The method of claim 1, wherein the at least one real-time performance parameter includes dynamic spectrum management data.

24. The method of claim 1, wherein the DSL network is an asymmetric DSL (ADSL) network, an ADSL 2 network, an ADSL 2+ network, a very high data transfer rate DSL (VDSL) network, or a VDSL 2 network.

25. A digital subscriber line (DSL) network, comprising:

a first modem at a central office;

a second modem at a remote site;

at least one DSL channel established between the first modem and the second modem; and a computer communicating with the first modem and the second modem, the computer comprising a program for modifying a provisionable service parameter associated with the DSL channel based on at least one measured in-service performance parameter received from at least one of the first modem or the second modem; wherein the at least one measured in-service performance parameter is measured over a predetermined time period to provide statistical confidence in the in-service performance parameter.

26. The network of claim 25, wherein the computer program comprises:

instructions to determine a value of at least one control parameter at least partially based on the at least one measured in-service performance parameter.

27. The network of claim 26, wherein the computer program further comprises:

instructions to monitor activity over the DSL channel while the DSL channel is in-service.

28. The network of claim 27, wherein the computer program further comprises:

instructions to determine when usage of the DSL channel is at or below a threshold.

29. The network of claim 28, wherein the computer program further comprises:

instructions to establish communications with at least one of the first modem and the second modem when usage of the DSL channel is below the threshold.

30. The network of claim 29, wherein the computer program further comprises:

instructions to modify the provisionable service parameter at least partially based on the measured in-service performance parameter.

31. The network of claim 30, wherein the computer program further comprises:

instructions to initiate a first re-training cycle between the first modem and the second modem, the first re-training cycle to apply the modified provisionable service parameter to the DSL channel.

32. The network of claim 31, wherein the computer program further comprises:

instructions to monitor the first modem and the second modem while the first modem and second modem are in-service.

33. The network of claim 32, wherein the computer program further comprises:

instructions to initiate a second re-training cycle between the first modem and the second modem after determining that service over the DSL channel is not restored.

34. The network of claim 33, wherein the computer program further comprises:

instructions to determine whether the DSL channel is operating within a predetermined operating range.

35. The network of claim 34, wherein the computer program further comprises:

instructions to modify the at least one provisionable service parameter after determining that the DSL channel is operating outside the predetermined operating range.

36. The network of claim 35, wherein the computer program further comprises:

instructions to monitor performance data of the first modem and the second modem.

37. The network of claim 36, wherein the computer program further comprises:

instructions to determine whether operation of the DSL channel is stable at least partially based on the monitored performance data.

38. A method for modifying a data network, comprising:

provisioning a data circuit within the data network with a first set of provisioning parameters;

acquiring a first set of in-service performance data from at least one terminating unit coupled to the data circuit; wherein the first set of in-service performance data is acquired over a predetermined period of time to establish statistical confidence of the first set of the in-service performance data;

determining a second set of provisioning parameters at least partially based on the first set of performance data; and re-provisioning the data circuit with the second set of provisioning parameters.

39. The method of claim 37, further comprising:

monitoring the data circuit while the data circuit is in-service.

40. The method of claim 39, further comprising:

determining whether operation of the data circuit is in a stable state.

41. The method of claim 40, further comprising:

acquiring a second set of in-service performance data from the at least one terminating unit coupled to the data circuit; wherein the second set of in-service performance data is acquired over a second predetermined period of time.

42. The method of claim 41, further comprising:

determining a third set of provisioning parameters at least partially based on the second set of performance data.

43. The method of claim 42, further comprising:

re-provisioning the data circuit with the third set of provisioning parameters.

44. The method of claim 43, wherein the first set of provisioning parameters, the second set of provisioning parameters, and the third set of provisioning parameters comprise:

at least one power control parameter;

at least one noise control parameter;

at least one data control parameter; and at least one forward error correction control parameter.

45. The method of claim 44, wherein the at least one power control parameter is at least one of the following:

a transmission power of a data signal; and a power spectral density of the data signal.

46. The method of claim 44, wherein the at least one noise control parameter is at least one of the following:

an additional noise margin and signal noise ratio;

a maximum noise margin and signal noise ratio; and a target noise margin and signal ratio.

47. The method of claim 44, wherein the at least one data control parameter comprises:

a dual path that indicates whether an interleaving setting is activate.

48. The method of claim 44, wherein the at least one forward error correction control parameter includes at least one of the following:

a Reed Solomon codeword length;

a parity value;

an interleave depth; and one or more data symbols.

49. The method of claim 43, wherein the first set of in-service performance data and the second set of in-service performance data comprise:

at least one noise parameter;

at least one error parameter;

at least one data transmission parameter; and at least one signal power parameter.

50. The method of claim 49, wherein the at least one noise parameter is at least one of the following:

a Noise Margin Ratio measured upstream and downstream in the data circuit;

a Quiet Line Noise measured during a predetermined time period for the data circuit;

a noise within the data circuit measured while the data circuit is in-service; and an insertion loss of the data circuit.

51. The method of claim 49, wherein the at least one error parameter is at least one of the following:

a time series of counts of Code Violations (CV), wherein each CV represents a data packet that could not be corrected by one or more forward-error-control parameters associated with the data circuit;

a time series of counts of Errored Seconds (ES), wherein each ES is a one second interval during which one to M CVs are observed and wherein M is a predetermined value; and a time sales of counts of Severely Errored Seconds (SES), wherein each SES is a one second interval during which greater than M CVs are observed.

52. The method of claim 49, wherein the at least one data transmission parameter is at least one of the following:

an assessment by the at least one terminating unit of the maximum data rate the data circuit can support;

an actual bit rate currently available to the customer;

a total number of bits available for each tone in the data circuit;

an attainable data transmission rate for the data circuit;

a gain for each tone in the data circuit;

a count during a predetermined time interval of the number of user data packets sent and received over the data circuit; and a count during a predetermined time interval of the number of overhead data packets sent and received over the data circuit.

53. The method of claim 49, wherein the at least one signal power parameter is at least one of the following:

a transmission power value of a data signal;

a power spectral density value of the data signal; and an attenuation value is the difference between the total maximum transmitted power at one end of the data circuit and a total power received at a remote end of the data circuit.

54. The method of claim 43, wherein the at least one real-time performance parameter is a margin available to accommodate signal losses.

55. The method of claim 43, wherein the at least one real-time performance parameter is a forward error correction parameter.

56. The method of claim 43, wherein the at least one real-time performance parameter is a dual path parameter that indicates whether an interleaving setting is activated.

57. The method of claim 43, wherein the at least one real-time performance parameter is a Trellis parameter that indicates whether Trellis coding is on or off.

58. The method of claim 43, wherein the at least one real-time performance parameter is a frequency range parameter that includes tone indices of the data circuit.

* * * * *